(12) United States Patent
Pitts et al.

(10) Patent No.: US 9,172,853 B2
(45) Date of Patent: *Oct. 27, 2015

(54) MICROLENS ARRAY ARCHITECTURE FOR AVOIDING GHOSTING IN PROJECTED IMAGES

(71) Applicant: Lytro, Inc., Mountain View, CA (US)

(72) Inventors: Colvin Pitts, Snohomish, WA (US); Timothy James Knight, Palo Alto, CA (US); Chia-Kai Liang, San Jose, CA (US); Yi-Ren Ng, Palo Alto, CA (US)

(73) Assignee: Lytro, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,132

(22) Filed: Aug. 11, 2014

(65) Prior Publication Data

US 2015/0029386 A1 Jan. 29, 2015

Related U.S. Application Data

(63) Continuation of application No. 13/774,971, filed on Feb. 22, 2013, now Pat. No. 8,831,377, which is a continuation-in-part of application No. 13/688,026, filed on Nov. 28, 2012, now Pat. No. 8,811,769.

(Continued)

(51) Int. Cl.
*G06K 7/00* (2006.01)
*H04N 5/217* (2011.01)
(Continued)

(52) U.S. Cl.
CPC ............ *H04N 5/217* (2013.01); *G02B 27/0018* (2013.01); *H04N 5/211* (2013.01); *H04N 5/2254* (2013.01); *H04N 17/002* (2013.01); *G02B 3/0056* (2013.01)

(58) Field of Classification Search
USPC .......... 382/162, 165, 167, 255, 275; 345/157, 345/419, 581; 348/222.1, 231.99, 239, 348/240.3, 340, 345, 349, E05.022; 250/208.1, 226; 359/368, 619; 396/79, 396/89
See application file for complete search history.

(56) References Cited

U.S. PATENT DOCUMENTS 725,567 A 4/1903 Ives
4,383,170 A 5/1983 Takagi et al.
(Continued)

FOREIGN PATENT DOCUMENTS

DE 19624421 6/1996
WO 03052465 6/2003
(Continued)

OTHER PUBLICATIONS

Wenger, et al, "Performance Relighting and Reflectance Transformation with Time-Multiplexed Illumination", Institute for Creative Technologies, SIGGRAPH 2005.
(Continued)

*Primary Examiner* — Amir Alavi
(74) *Attorney, Agent, or Firm* — Raubvogel Law Office

(57) ABSTRACT

Light-field image data is processed in a manner that reduces projection artifacts in the presence of variation in microlens position by calibrating microlens positions. Approximate centers of disks in a light-field image are identified, and gridded calibration is performed, by fitting lines to disk centers along orthogonal directions, and then fitting a rigid grid to the light-field image. For each grid region, a corresponding disk center is computed, and a displacement vector is generated. For each grid region, the final disk center is computed as the vector sum of the grid region's geometric center and displacement vector. Calibration data, including displacement vectors, is then used in calibrating disk centers for more accurate projection of light-field images. In at least one embodiment, the imaging geometry is arranged so that disks are separated by a gap, so as to limit or eliminate ghosting.

12 Claims, 12 Drawing Sheets

Related U.S. Application Data

(60) Provisional application No. 61/604,155, filed on Feb. 28, 2012, provisional application No. 61/604,175, filed on Feb. 28, 2012, provisional application No. 61/604,195, filed on Feb. 28, 2012, provisional application No. 61/655,790, filed on Jun. 5, 2012.

(51) Int. Cl.
| | |
|---|---|
| *H04N 17/00* | (2006.01) |
| *H04N 5/225* | (2006.01) |
| *G02B 27/00* | (2006.01) |
| *H04N 5/21* | (2006.01) |
| *G02B 3/00* | (2006.01) |

(56) References Cited

U.S. PATENT DOCUMENTS

| | | | |
|---|---|---|---|
| 4,661,986 | A | 4/1987 | Adelson |
| 4,694,185 | A | 9/1987 | Weiss |
| 4,920,419 | A | 4/1990 | Easterly |
| 5,076,687 | A | 12/1991 | Adelson |
| 5,282,045 | A | 1/1994 | Mimura et al. |
| 5,610,390 | A | 3/1997 | Miyano |
| 5,748,371 | A | 5/1998 | Cathey, Jr. et al. |
| 5,757,423 | A | 5/1998 | Tanaka et al. |
| 5,835,267 | A | 11/1998 | Mason et al. |
| 5,949,433 | A | 9/1999 | Klotz |
| 6,023,523 | A | 2/2000 | Cohen et al. |
| 6,028,606 | A | 2/2000 | Kolb et al. |
| 6,097,394 | A | 8/2000 | Levoy et al. |
| 6,201,899 | B1 | 3/2001 | Bergen |
| 6,320,979 | B1 | 11/2001 | Melen |
| 6,483,535 | B1 | 11/2002 | Tamburrino et al. |
| 6,529,265 | B1* | 3/2003 | Henningsen ............ 355/71 |
| 6,577,342 | B1 | 6/2003 | Webster |
| 6,597,859 | B1 | 7/2003 | Leinhardt et al. |
| 6,842,297 | B2 | 1/2005 | Dowski, Jr. et al. |
| 6,900,841 | B1 | 5/2005 | Mihara |
| 6,927,922 | B2 | 8/2005 | George et al. |
| 7,034,866 | B1 | 4/2006 | Colmenarez et al. |
| 7,206,022 | B2 | 4/2007 | Miller et al. |
| 7,329,856 | B2* | 2/2008 | Ma et al. ............ 250/226 |
| 7,336,430 | B2 | 2/2008 | George |
| 7,620,309 | B2 | 11/2009 | Georgiev |
| 7,623,726 | B1 | 11/2009 | Georgiev |
| 7,723,662 | B2* | 5/2010 | Levoy et al. ............ 250/208.1 |
| 7,936,392 | B2 | 5/2011 | Ng et al. |
| 7,945,653 | B2 | 5/2011 | Zuckerberg et al. |
| 7,949,252 | B1 | 5/2011 | Georgiev |
| 8,155,478 | B2 | 4/2012 | Vitsnudel et al. |
| 8,279,325 | B2 | 10/2012 | Pitts et al. |
| 8,289,440 | B2 | 10/2012 | Knight et al. |
| 8,290,358 | B1 | 10/2012 | Georgiev |
| 8,427,548 | B2* | 4/2013 | Lim et al. ............ 348/222.1 |
| 8,446,516 | B2 | 5/2013 | Pitts et al. |
| 8,559,705 | B2 | 10/2013 | Ng |
| 8,577,216 | B2 | 11/2013 | Li et al. |
| 8,581,998 | B2* | 11/2013 | Ohno ............ 348/222.1 |
| 8,724,014 | B2* | 5/2014 | Ng et al. ............ 348/349 |
| 2002/0159030 | A1 | 10/2002 | Frey et al. |
| 2003/0103670 | A1 | 6/2003 | Schoelkopf et al. |
| 2003/0117511 | A1 | 6/2003 | Belz et al. |
| 2003/0156077 | A1 | 8/2003 | Balogh |
| 2004/0114176 | A1 | 6/2004 | Bodin et al. |
| 2004/0257360 | A1 | 12/2004 | Sieckmann |
| 2005/0080602 | A1 | 4/2005 | Snyder et al. |
| 2006/0130017 | A1 | 6/2006 | Cohen et al. |
| 2007/0071316 | A1 | 3/2007 | Kubo |
| 2007/0230944 | A1 | 10/2007 | Georgiev |
| 2007/0252074 | A1 | 11/2007 | Ng et al. |
| 2008/0007626 | A1 | 1/2008 | Wernersson |
| 2008/0018668 | A1 | 1/2008 | Yamauchi |
| 2008/0131019 | A1 | 6/2008 | Ng |
| 2008/0152215 | A1 | 6/2008 | Horie et al. |
| 2008/0180792 | A1* | 7/2008 | Georgiev ............ 359/368 |
| 2008/0187305 | A1 | 8/2008 | Raskar et al. |
| 2008/0193026 | A1 | 8/2008 | Horie et al. |
| 2008/0226274 | A1 | 9/2008 | Spielberg |
| 2008/0266655 | A1 | 10/2008 | Levoy et al. |
| 2008/0277566 | A1 | 11/2008 | Utagawa |
| 2008/0309813 | A1 | 12/2008 | Watanabe |
| 2009/0027542 | A1 | 1/2009 | Yamamoto et al. |
| 2009/0041381 | A1 | 2/2009 | Georgiev et al. |
| 2009/0041448 | A1 | 2/2009 | Georgiev et al. |
| 2009/0102956 | A1 | 4/2009 | Georgiev |
| 2009/0128658 | A1 | 5/2009 | Hayasaka et al. |
| 2009/0128669 | A1 | 5/2009 | Ng et al. |
| 2009/0140131 | A1 | 6/2009 | Utagawa |
| 2009/0185801 | A1 | 7/2009 | Georgiev et al. |
| 2009/0190022 | A1 | 7/2009 | Ichimura |
| 2009/0190024 | A1 | 7/2009 | Hayasaka et al. |
| 2009/0268970 | A1 | 10/2009 | Babacan et al. |
| 2009/0273843 | A1 | 11/2009 | Raskar et al. |
| 2009/0295829 | A1 | 12/2009 | Georgiev et al. |
| 2010/0026852 | A1 | 2/2010 | Ng et al. |
| 2010/0128145 | A1 | 5/2010 | Pitts et al. |
| 2010/0129048 | A1 | 5/2010 | Pitts et al. |
| 2010/0141802 | A1 | 6/2010 | Knight et al. |
| 2010/0277629 | A1 | 11/2010 | Tanaka |
| 2011/0129165 | A1 | 6/2011 | Lim et al. |
| 2011/0234841 | A1 | 9/2011 | Akeley et al. |
| 2012/0050562 | A1 | 3/2012 | Perwass et al. |
| 2012/0249550 | A1 | 10/2012 | Akeley et al. |
| 2012/0327222 | A1 | 12/2012 | Ng et al. |
| 2013/0033636 | A1 | 2/2013 | Pitts et al. |
| 2013/0113981 | A1 | 5/2013 | Knight et al. |
| 2013/0128081 | A1 | 5/2013 | Georgiev et al. |
| 2014/0184885 | A1* | 7/2014 | Tanaka et al. ............ 348/345 |

FOREIGN PATENT DOCUMENTS

| | | |
|---|---|---|
| WO | 2006039486 | 4/2006 |
| WO | 2006129677 | 12/2006 |
| WO | 2007092545 | 8/2007 |
| WO | 2007092581 | 8/2007 |

OTHER PUBLICATIONS

Chen, W., et al., "Light field mapping: Efficient representation and hardware rendering of surface light fields". ACM Transactions on Graphics 21, 3, 447-456, 2002.

Debevec, R, et al., "Recovering high dynamic range radiance maps from photographs", SIGGRAPH 1997, 369-378.

Debevec, P., et al., "Acquiring the reflectance field of a human face", SIGGRAPH 2000.

Dorsey, J., et al., "Design and simulation of opera lighting and projection effects", in Computer Graphics (Proceedings of SIGGRAPH 91), vol. 25, 41-50.

Nimeroff, J., et al., "Efficient rerendering of naturally illuminated environments", in Fifth Eurographics Workshop on Rendering, 359-373, 1994.

Ramamoorthi, R., et al., "An efficient representation for irradiance environment maps", in Proceedings of SIGGRAPH 2001, 497-500.

Sloan, P., et al., "Precomputed radiance transfer for real-time rendering in dynamic, low-frequency lighting environments", ACM Transactions on Graphics 21, 3, 527-536, 2002.

Teo, P., et al., "Efficient linear rerendering for interactive lighting design", Tech. Rep. STAN-CS-TN-97-60, 1997, Stanford University.

Ng, R., et al., "Triple Product Wavelet Integrals for All-Frequency Relighting", ACM Transactions on Graphics (Proceedings of SIGGRAPH 2004).

Dorsey, J., et al., "Interactive design of complex time dependent lighting", IEEE Computer Graphics and Applications 15, 2 (Mar. 1995), 26-36.

Kautz, J., et al., "Fast arbitrary BRDF shading for low-frequency lighting using spherical harmonics", in Eurographics Rendering Workshop 2002, 291-296.

Lehtinen, J., et al., "Matrix radiance transfer", in Symposium on Interactive 3D graphics, 59-64, 2003.

Ramamoorthi, R., et al., "Frequency space environment map rendering", ACM Transactions on Graphics (SIGGRAPH 2002 proceedings) 21, 3, 517-526.

(56) References Cited

OTHER PUBLICATIONS

Winnemöller, H., et al., "Light Waving: Estimating Light Positions From Photographs Alone", Eurographics 2005.
Masselus, Vincent et al., "Relighting with 4D Incident Light Fields", SIGGRAPH 2003.
Fattal, Raanan et al., "Multiscale Shape and Detail Enhancement from Multi-light Image Collections", SIGGRAPH 2007.
Petschnigg, George et al., "Digital Photography with Flash and No-Flash Image Pairs", SIGGRAPH 2004.
Eisemann, Elmar et al., "Flash Photography Enhancement via Intrinsic Relighting", SIGGRAPH 2004.
Raskar, Ramesh et al., "Non-photorealistic Camera: Depth Edge Detection and Stylized Rendering using Multi-Flash Imaging", SIGGRAPH 2004.
Canon Speedlite wireless flash system: see, for example, User manual for Model 550EX. Sep. 1998.
Belhumeur, Peter et al., "The Bas-Relief Ambiguity", International Journal of Computer Vision, 1997, pp. 1060-1066.
Belhumeur, Peter et al., "The Bas-Relief Ambiguity", International Journal of Computer Vision, 1999, pp. pp. 33-44, revised version.
Wetzstein, Gordon, et al., "Sensor Saturation in Fourier Multiplexed Imaging", IEEE Conference on Computer Vision and Pattern Recognition (2010).
Nayar, Shree, et al., "Shape from Focus", IEEE Transactions on Pattern Analysis and Machine Intelligence, vol. 16, No. 8, pp. 824-831, Aug. 1994.
Levoy, Marc, "Autofocus: Phase Detection", http://graphics.stanford.edu/courses/cs178/applets/autofocusPD.html, pp. 1-3, 2010.
Sony Corporation, "Interchangeable Lens Digital Camera Handbook", 2011.
Wilburn, Bennett, et al., "The Light Field Video Camera", Proceedings of Media Processors 2002.
Wilburn, Bennett, et al., "High Speed Video Using a Dense Camera Array", 2004.
Debevec et al., "A Lighting Reproduction Approach to Live-Action Compositing", Proceedings SIGGRAPH 2002.
Sun, Jian, et al., "Stereo Matching Using Belief Propagation", 2002.
Adelson et al., "Single Lens Stereo with a Plenoptic Camera" IEEE Translation on Pattern Analysis and Machine Intelligence, Feb. 1992. vol. 14, No. 2, pp. 99-106.
Agarwala, A., et al., "Interactive Digital Photomontage," ACM Transactions on Graphics, Proceedings of SIGGRAPH 2004, vol. 32, No. 3, 2004.
Chai, Jin-Xang et al., "Plenoptic Sampling", ACM SIGGRAPH 2000, Annual Conference Series, 2000, pp. 307-318.
Dowski et al., "Wavefront coding: a modern method of achieving high performance and/or low cost imaging systems" SPIE Proceedings, vol. 3779, Jul. 1999, pp. 137-145.
Georgiev, T., et al., "Spatio-Angular Resolution Tradeoff in Integral Photography," Proceedings of Eurographics Symposium on Rendering, 2006.
Gortler et al., "The lumigraph" SIGGRAPH 96, pp. 43-54.
Haeberli, "A Multifocus Method for Controlling Depth of Field" GRAPHICA Obscura, 1994, pp. 1-3.
Isaksen, A., et al., "Dynamically Reparameterized Light Fields," SIGGRAPH 2000, pp. 297-306.
Ives, H., "Optical properties of a Lippman lenticulated sheet," J. Opt. Soc. Am. 21, 171 (1931).
Jackson et al., "Selection of a Convolution Function for Fourier Inversion Using Gridding" IEEE Transactions on Medical Imaging, Sep. 1991, vol. 10, No. 3, pp. 473-478.
Levoy, M., et al., "Light Field Microscopy," ACM Transactions on Graphics, vol. 25, No. 3, Proceedings SIGGRAPH 2006.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Lippmann, "Reversible Prints", Communication at the French Society of Physics, Journal of Physics, Mar. 20, 1908, pp. 821-825.
Lumsdaine et al., "Full Resolution Lightfield Rendering" Adobe Technical Report Jan. 2008, pp. 1-12.
Naemura et al., "3-D Computer Graphics based on Integral Photography" Optics Express, Feb. 12, 2001. vol. 8, No. 2, pp. 255-262.

Ng, R., et al. "Light Field Photography with a Hand-held Plenoptic Camera," Stanford Technical Report, CSTR 2005-2, 2005.
Ng, R., "Digital Light Field Photography," Dissertation, Department of Computer Science, Stanford University, Jun. 2006.
Ng., R., "Fourier Slice Photography," ACM Transactions on Graphics, Proceedings of SIGGRAPH 2005, vol. 24, No. 3, 2005, pp. 735-744.
Okano et al., "Three-dimensional video system based on integral photograohy" Optical Engineering, Jun. 1999, vol. 38, No. 6, pp. 1072-1077.
Sokolov, "Autostereoscopy and Integral Photography by Professor Lippmann's Method", 1911, pp. 23-29.
Tanida et al., "Thin observation module by bound optics (TOMBO): concept and experimental verification" Applied Optics 40, 11 (Apr. 10, 2001), pp. 1806-1813.
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
Vaish et al., "Using plane + parallax for calibrating dense camera arrays", In Proceedings CVPR 2004, pp. 2-9.
Wilburn et al., "High Performance Imaging Using Large Camera Arrays", ACM Transactions on Graphics (TOG), vol. 24, Issue 3 (Jul. 2005), Proceedings of ACM SIGGRAPH 2005, pp. 765-776.
Adobe Systems Incorporated, "XMP Specification", Sep. 2005.
Fitzpatrick, Brad, "Camlistore", Feb. 1, 2011.
Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.
Adobe, "Photoshop CS6 / in depth: Digital Negative (DNG)", http://www.adobe.com/products/photoshop/extend.displayTab2html. Retrieved Jan. 2013.
Georgiev, T., et al., Plenoptic Camera 2.0 (2008).
Georgiev, T., et al., "Unified Frequency Domain Analysis of Lightfield Cameras" (2008).
Ives, Herbert, "Parallax Panoramagrams Made with a Large Diameter Lens", 1930.
Liang, Chia-Kai, et al., "Programmable Aperture Photography: Multiplexed Light Field Acquisition", ACM SIGGRAPH 2008.
Mallat, Stephane, "A Wavelet Tour of Signal Processing", Academic Press 1998.
Ogden, J., "Pyramid-Based Computer Graphics", 1985.
Snavely, Noah, et al., "Photo tourism: Exploring photo collections in 3D", ACM Transactions on Graphics (SIGGRAPH Proceedings), 2006.
Story, D., "The Future of Photography", Optics Electronics, Oct. 2008.
Takahashi, Keita, et al., "All in-focus View Synthesis from Under-Sampled Light Fields", ICAT 2003, Tokyo, Japan.
Williams, L., "Pyramidal Parametrics", Computer Graphics (1983).
Portable Network Graphics format: http://en.wikipedia.org/wiki/Portable_Network_Graphics. Retrieved Jan. 2013.
Exchangeable image file format: http://en.wikipedia.org/wiki/Exchangeable_image_file_format. Retrieved Jan. 2013.
Extensible Metadata Platform: http://en.wikipedia.org/wiki/Extensible_Metadata_Platform. Retrieved Jan. 2013.
Compression standard JPEG XR: http://en.wikipedia.org/wiki/JPEG_XR. Retrieved Jan. 2013.
Methods of Variable Bitrate Encoding (http://en.wikipedia.org/wiki/Variable_bitrate#Methods_of_VBR_encoding). Retrieved Jan. 2013.
Lazy loading of image data (http://en.wikipedia.org/wiki/Lazy_loading). Retrieved Jan. 2013.
Key framing for video animation (http://en.wikipedia.org/wiki/Key_frame). Retrieved Jan. 2013.
Data overlay techniques for real-time visual feed. For example, heads-up displays (http://en.wikipedia.org/wiki/Head-up_display). Retrieved Jan. 2013.
Autofocus systems and methods (http://en.wikipedia.org/wiki/Autofocus). Retrieved Jan. 2013.
Nakamura, J., "Image Sensors and Signal Processing for Digital Still Cameras" (Optical Science and Engineering), 2005.

* cited by examiner

MICROLENS ARRAY ARCHITECTURE FOR AVOIDING GHOSTING IN PROJECTED IMAGES

CROSS-REFERENCE TO RELATED APPLICATIONS

The present application claims priority as a continuation of U.S. Utility application Ser. No. 13/774,971 for "Compensating for Variation in Microlens Position During Light-Field Image Processing," filed on Feb. 22, 2013, now U.S. Pat. No. 8,831,377 the disclosure of which is incorporated herein by reference in its entirety.

U.S. Utility application Ser. No. 13/774,971 claims priority from U.S. Provisional Application Ser. No. 61/604,155 for "Compensating for Sensor Saturation and Microlens Modulation During Light-Field Image Processing," filed on Feb. 28, 2012, the disclosure of which is incorporated herein by reference in its entirety.

U.S. Utility application Ser. No. 13/774,971 further claims priority from U.S. Provisional Application Ser. No. 61/604,175 for "Compensating for Variation in Microlens Position During Light-Field Image Processing," filed on Feb. 28, 2012, the disclosure of which is incorporated herein by reference in its entirety.

U.S. Utility application Ser. No. 13/774,971 further claims priority from U.S. Provisional Application Ser. No. 61/604,195 for "Light-Field Processing and Analysis, Camera Control, and User Interfaces and Interaction on Light-Field Capture Devices," filed on Feb. 28, 2012, the disclosure of which is incorporated herein by reference in its entirety.

U.S. Utility application Ser. No. 13/774,971 further claims priority from U.S. Provisional Application Ser. No. 61/655,790 for "Extending Light-Field Processing to Include Extended Depth of Field and Variable Center of Perspective," filed on Jun. 5, 2012, the disclosure of which is incorporated herein by reference in its entirety.

U.S. Utility application Ser. No. 13/774,971 further claims priority as a continuation-in-part of U.S. Utility application Ser. No. 13/688,026 for "Extended Depth of Field and Variable Center of Perspective In Light-Field Processing," filed on Nov. 28, 2012, the disclosure of which is incorporated herein by reference in its entirety.

The present application is related to U.S. Utility application Ser. No. 11/948,901 for "Interactive Refocusing of Electronic Images," filed Nov. 30, 2007, the disclosure of which is incorporated herein by reference in its entirety.

The present application is related to U.S. Utility application Ser. No. 12/703,367 for "Light-field Camera Image, File and Configuration Data, and Method of Using, Storing and Communicating Same," filed Feb. 10, 2010, the disclosure of which is incorporated herein by reference in its entirety.

The present application is related to U.S. Utility application Ser. No. 13/027,946 for "3D Light-field Cameras, Images and Files, and Methods of Using, Operating, Processing and Viewing Same," filed on Feb. 15, 2011, the disclosure of which is incorporated herein by reference in its entirety.

The present application is related to U.S. Utility application Ser. No. 13/155,882 for "Storage and Transmission of Pictures Including Multiple Frames," filed Jun. 8, 2011, the disclosure of which is incorporated herein by reference in its entirety.

The present application is related to U.S. Utility application Ser. No. 13/664,938 for "Light-field Camera Image, File and Configuration Data, and Method of Using, Storing and Communicating Same," filed Oct. 31, 2012, the disclosure of which is incorporated herein by reference in its entirety.

The present application is related to U.S. Utility application Ser. No. 13/774,925 for "Compensating for Sensor Saturation and Microlens Modulation During Light-Field Image Processing," filed on Feb. 22, 2013, the disclosure of which is incorporated herein by reference in its entirety.

The present application is related to U.S. Utility application Ser. No. 13/774,986 for "Light-Field Processing and Analysis, Camera Control, and User Interfaces and Interaction on Light-Field Capture Devices," filed on Feb. 22, 2013, the disclosure of which is incorporated herein by reference in its entirety.

FIELD OF THE INVENTION

The present invention relates to systems and methods for processing and displaying light-field image data.

SUMMARY

According to various embodiments, the system and method of the present invention process light-field image data in a manner that reduces projection artifacts, such as geometric distortion and ghosting, in the presence of variation in microlens position.

In at least one embodiment, the system and method of the present invention provide techniques for calibrating microlens positions. Initially, approximate centers of disks in a light-field image are identified, for example by determining weight-centers of pixel values illuminated by rays passing through the corresponding microlens. Gridded calibration is then performed, by fitting lines to disk centers along orthogonal directions, and then fitting a rigid grid to the light-field image. For each grid region, a corresponding disk center is computed by passing values for pixels within that grid region into weighted-center equations. A displacement vector is then generated, based on the distance from the geometric center of the grid region to the computed disk center. For each grid region, the final disk center is computed as the vector sum of the grid region's geometric center and displacement vector. Calibration data, including displacement vectors, is then used in calibrating disk centers for more accurate projection of light-field images.

In at least one embodiment, the imaging geometry is arranged so that disks are separated by a gap. Sensor pixels are "assigned" to the nearest microlens center, in calibrated coordinates, so gaps allow calibration errors up to half the gap size before a pixel's assignment snaps to the incorrect microlens. Such a technique limits or eliminates ghosting, since, until such snapping occurs, calibration errors may result in only geometric distortion, rather than ghosting.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Definitions

Figure 1:
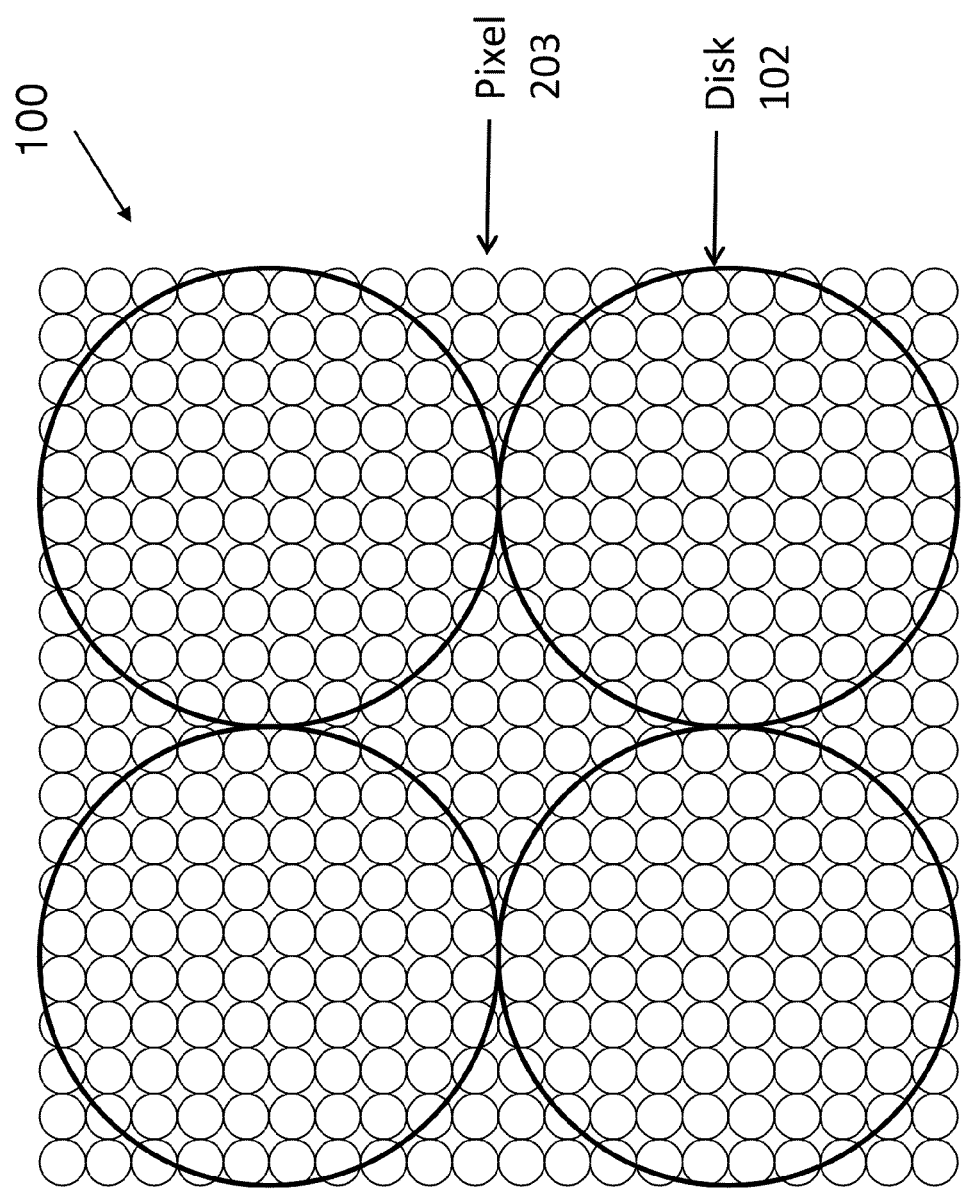
FIG. 1 depicts a portion of a light-field image.

For purposes of the description provided herein, the following definitions are used:

aggregated irradiance: total irradiance over a period of time, e.g., on a sensor pixel while the shutter is open.

anterior nodal point: the nodal point on the scene side of a lens.

Bayer pattern: a particular 2×2 pattern of different color filters above pixels on a digital sensor. The filter pattern is 50% green, 25% red and 25% blue.

clamp: in the context of the described invention, to "clamp a signal to a value" means to select the smaller of the signal value and the clamp value.

disk: a region in a light-field image that is illuminated by light passing through a single microlens; may be circular or any other suitable shape.

entrance pupil: the image of the aperture of a lens, viewed from the side of the lens that faces the scene.

exit pupil: the image of the aperture of a lens, viewed from the side of the lens that faces the image.

flat-field image: a light-field image of a scene with undifferentiated rays.

flat-field response contour: a continuous plot of the value that a hypothetical sensor pixel would take if centered at various locations on the surface of a sensor.

image: a two-dimensional array of pixel values, or pixels, each specifying a color.

lambda: a measure of distance perpendicular to the primary surface of the microlens array. One lambda corresponds to the perpendicular distance along which the diameter of the cone of light from a point in the scene changes by a value equal to the pitch of the microlens array.

light-field image: an image that contains a representation of light-field data captured at the sensor.

microlens: a small lens, typically one in an array of similar microlenses.

MLA: abbreviation for microlens array.

modulation image: an image that is computed from a flat-field image by normalizing based on average values (per color channel).

nodal point: the center of a radially symmetric thin lens. For a lens that cannot be treated as thin, one of two points that together act as thin-lens centers, in that any ray that enters one point exits the other along a parallel path.

normalized pixel value: a sensor pixel value that has been adjusted to a range where 0.0 corresponds to black (no light) and 1.0 corresponds to saturation.

representative ray: a single ray that represents all the rays that reach a pixel.

vignetting: a phenomenon, related to modulation, in which an image's brightness or saturation is reduced at the periphery as compared to the image center.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present invention, and that the invention is not limited to cameras. Thus, the use of the term "camera" herein is intended to be illustrative and exemplary, but should not be considered to limit the scope of the invention. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another.

Architecture

Figure 6A:
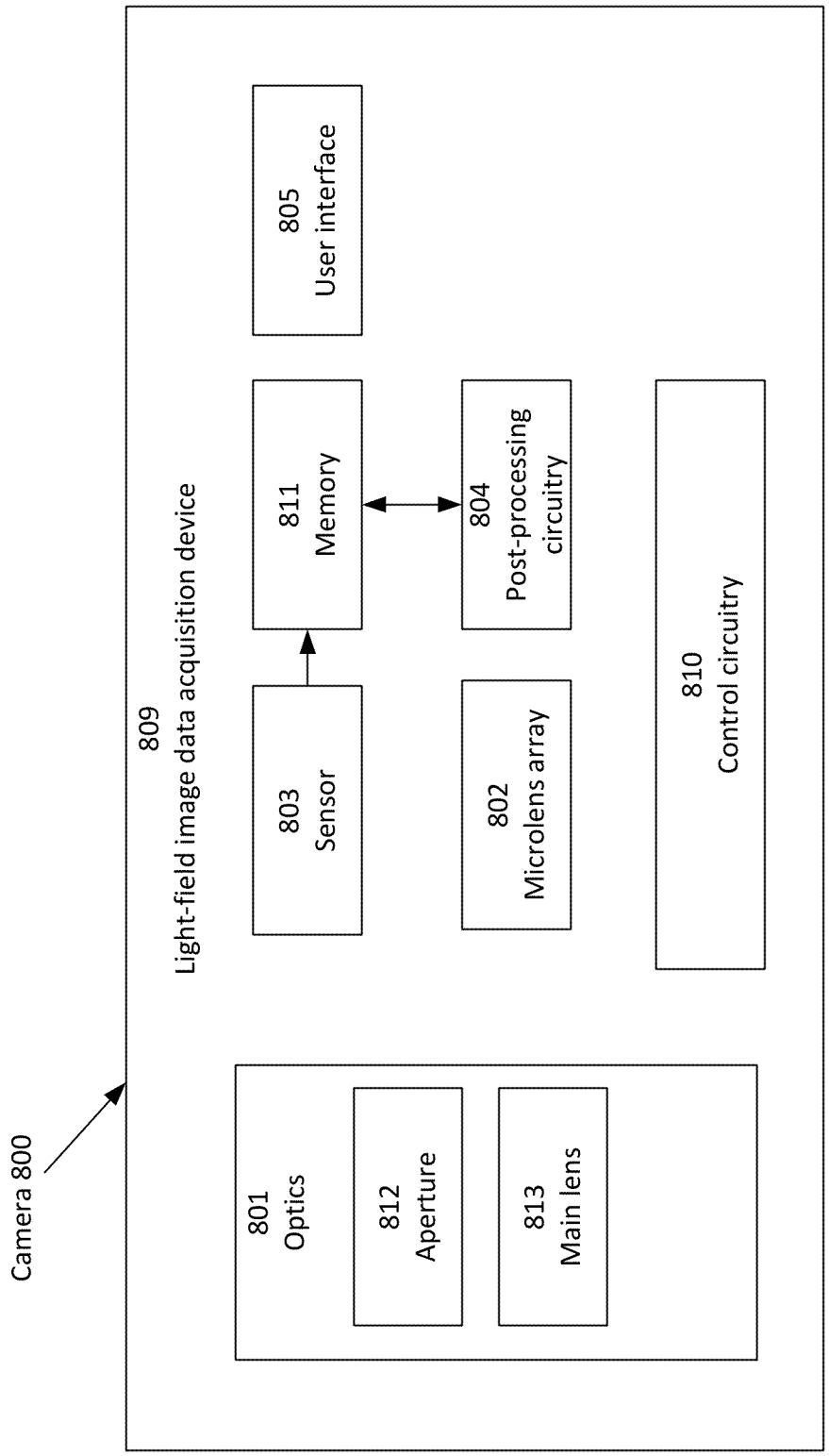
FIG. 6A depicts an example of an architecture for implementing the present invention in a light-field capture device, according to one embodiment.
Figure 6B:
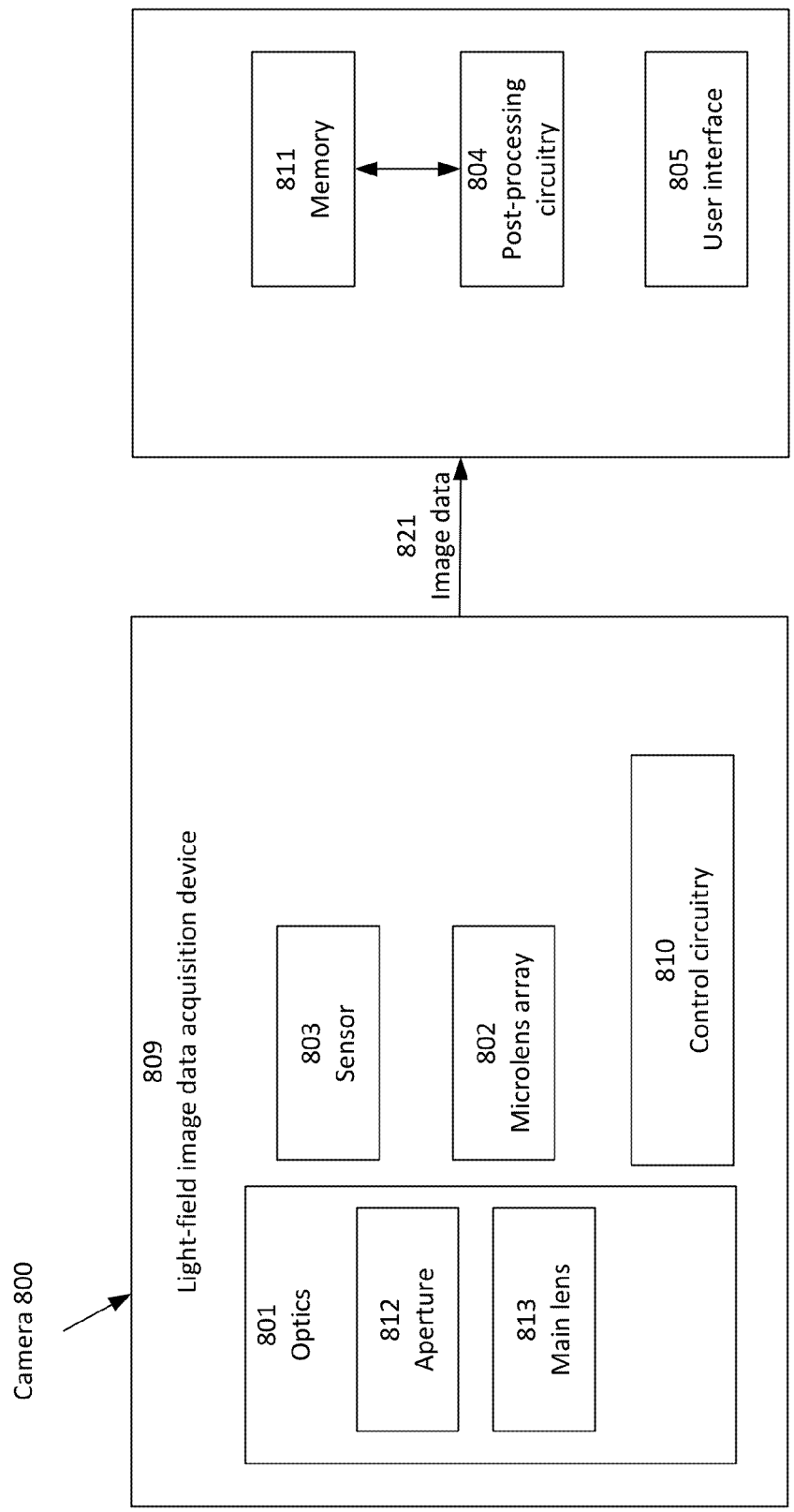
FIG. 6B depicts an example of an architecture for implementing the present invention in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 6A, there is shown a block diagram depicting an architecture for implementing the present invention in a light-field capture device such as a camera 800. Referring now also to FIG. 6B, there is shown a block diagram depicting an architecture for implementing the present invention in a post-processing system communicatively coupled to a light-field capture device such as a camera 800, according to one embodiment. One skilled in the art will recognize that the particular configurations shown in FIGS. 6A and 6B are merely exemplary, and that other architectures are possible for camera 800. One skilled in the art will further recognize that several of the components shown in the configurations of FIGS. 6A and 6B are optional, and may be omitted or reconfigured.

Figure 7:
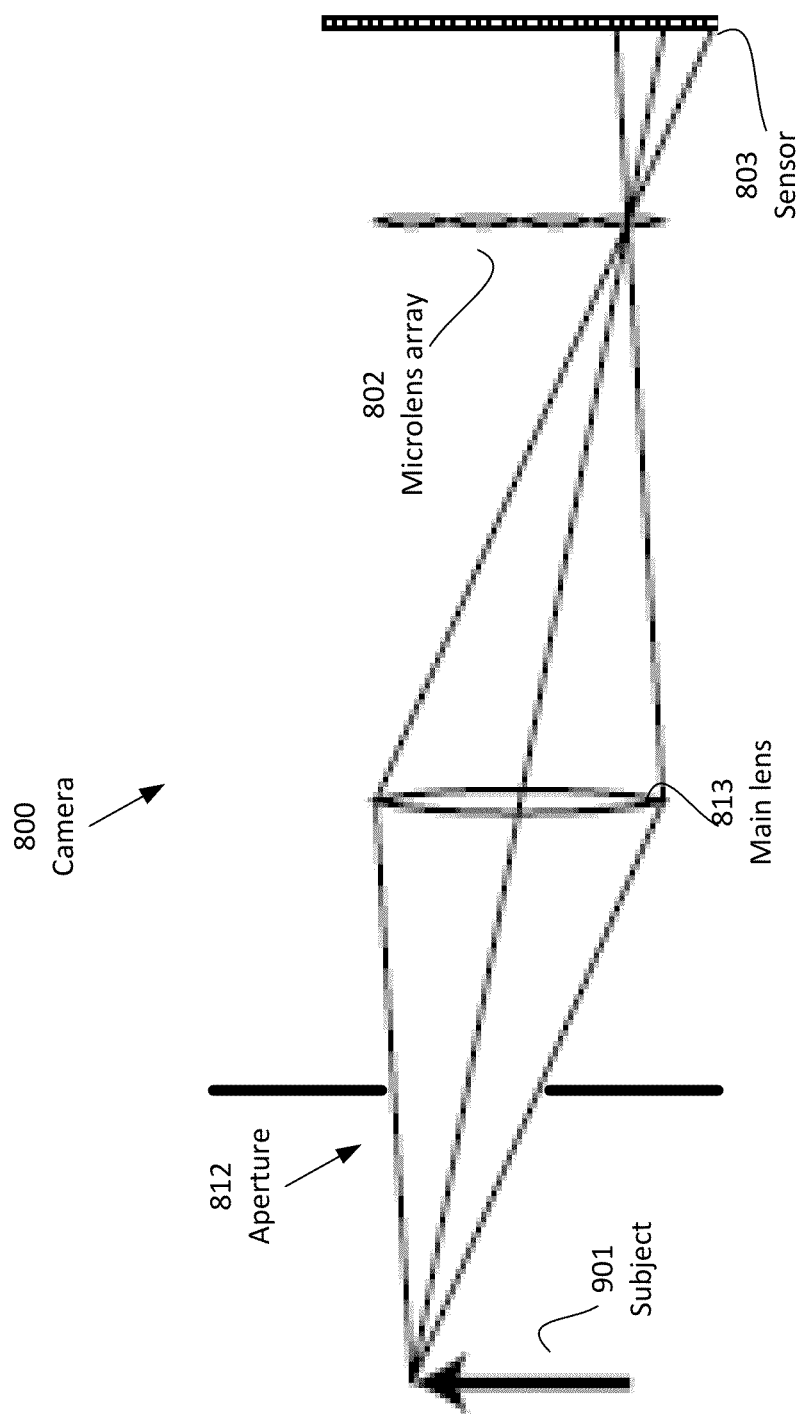
FIG. 7 depicts an example of an architecture for a light-field camera for implementing the present invention according to one embodiment.

In at least one embodiment, camera 800 may be a light-field camera that includes light-field image data acquisition device 809 having optics 801, image sensor 803 (including a plurality of individual sensors for capturing pixels), and microlens array 802. Optics 801 may include, for example, aperture 812 for allowing a selectable amount of light into camera 800, and main lens 813 for focusing light toward microlens array 802. In at least one embodiment, microlens array 802 may be disposed and/or incorporated in the optical path of camera 800 (between main lens 813 and sensor 803) so as to facilitate acquisition, capture, sampling of, recording, and/or obtaining light-field image data via sensor 803. Referring now also to FIG. 7, there is shown an example of an architecture for a light-field camera 800 for implementing the present invention according to one embodiment. The Figure is not shown to scale. FIG. 7 shows, in conceptual form, the relationship between aperture 812, main lens 813, microlens array 802, and sensor 803, as such components interact to capture light-field data for subject 901.

In at least one embodiment, light-field camera 800 may also include a user interface 805 for allowing a user to provide input for controlling the operation of camera 800 for capturing, acquiring, storing, and/or processing image data.

In at least one embodiment, light-field camera 800 may also include control circuitry 810 for facilitating acquisition, sampling, recording, and/or obtaining light-field image data. For example, control circuitry 810 may manage and/or control (automatically or in response to user input) the acquisition timing, rate of acquisition, sampling, capturing, recording, and/or obtaining of light-field image data.

In at least one embodiment, camera 800 may include memory 811 for storing image data, such as output by image sensor 803. Such memory 811 can include external and/or internal memory. In at least one embodiment, memory 811 can be provided at a separate device and/or location from camera 800.

For example, camera 800 may store raw light-field image data, as output by sensor 803, and/or a representation thereof, such as a compressed image data file. In addition, as described in related U.S. Utility application Ser. No. 12/703,367 for "Light-field Camera Image, File and Configuration Data, and Method of Using, Storing and Communicating Same,", filed Feb. 10, 2010, memory 811 can also store data representing the characteristics, parameters, and/or configurations (collectively "configuration data") of device 809.

In at least one embodiment, captured image data is provided to post-processing circuitry 804. Such circuitry 804 may be disposed in or integrated into light-field image data acquisition device 809, as shown in FIG. 6A, or it may be in a separate component external to light-field image data acquisition device 809, as shown in FIG. 6B. Such separate component may be local or remote with respect to light-field image data acquisition device 809. Any suitable wired or wireless protocol can be used for transmitting image data 821 to circuitry 804; for example camera 800 can transmit image data 821 and/or other data via the Internet, a cellular data network, a WiFi network, a BlueTooth communication protocol, and/or any other suitable means.

Overview

Light-field images often include a plurality of projections (which may be circular or of other shapes) of aperture 812 of camera 800, each projection taken from a different vantage point on the camera's focal plane. The light-field image may be captured on sensor 803. The interposition of microlens array 802 between main lens 813 and sensor 803 causes images of aperture 812 to be formed on sensor 803, each microlens in array 802 projecting a small image of main-lens aperture 812 onto sensor 803. These aperture-shaped projections are referred to herein as disks, although they need not be circular in shape. The term "disk" is not intended to be limited to a circular region, but can refer to a region of any shape.

Light-field images include four dimensions of information describing light rays impinging on the focal plane of camera 800 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x, y, u, v) resolution of (400, 300, 10, 10). Referring now to FIG. 1, there is shown an example of a 2-disk by 2-disk portion of such a light-field image, including depictions of disks 102 and individual pixels 203; for illustrative purposes, each disk 102 is ten pixels 203 across.

Figure 2:
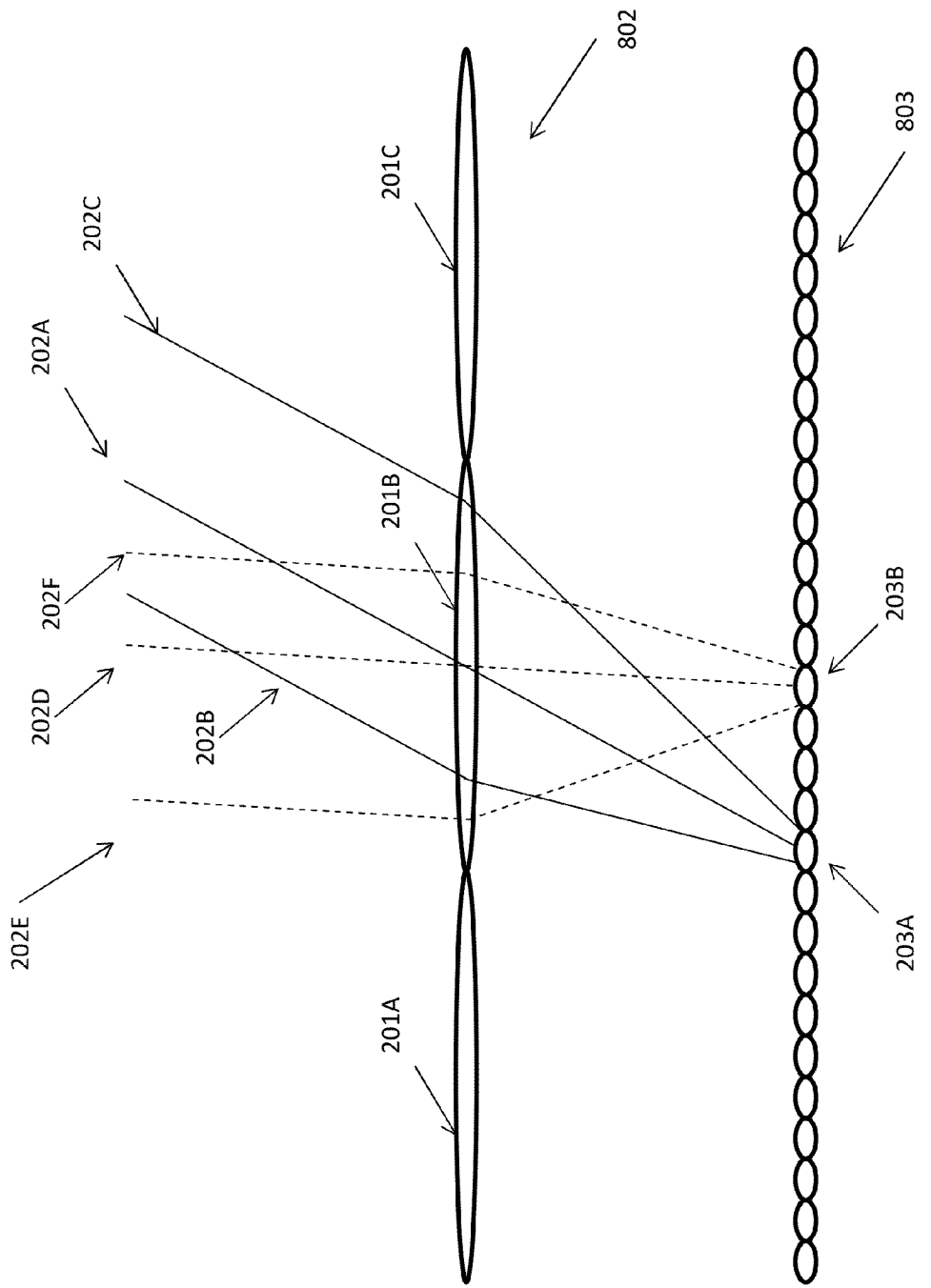
FIG. 2 depicts transmission of light rays through a microlens to illuminate pixels in a digital sensor.

Many light rays in the light-field within a light-field camera contribute to the illumination of a single pixel 203. Referring now to FIG. 2, there is shown an example of transmission of light rays 202, including representative rays 202A, 202D, through microlens 201B of array 802, to illuminate sensor pixels 203A, 203B in sensor 803.

In the example of FIG. 2, solid rays 202A, 202B, 202C illuminate sensor pixel 203A, while dashed rays 202D, 202E, 202F illuminate sensor pixel 203B. The value at each sensor pixel 203 is determined by the sum of the irradiance of all rays 202 that illuminate it. For illustrative and descriptive purposes, however, it may be useful to identify a single geometric ray 202 with each sensor pixel 203. That ray 202 may be chosen to be representative of all the rays 202 that illuminate that sensor pixel 203, and is therefore referred to herein as a representative ray 202. Such representative rays 202 may be chosen as those that pass through the center of a particular microlens 201, and that illuminate the center of a particular sensor pixel 203. In the example of FIG. 2, rays 202A and 202D are depicted as representative rays; both rays 202A, 202D pass through the center of microlens 201B, with ray 202A representing all rays 202 that illuminate sensor pixel 203A and ray 202D representing all rays 202 that illuminate sensor pixel 203B.

Figure 3:
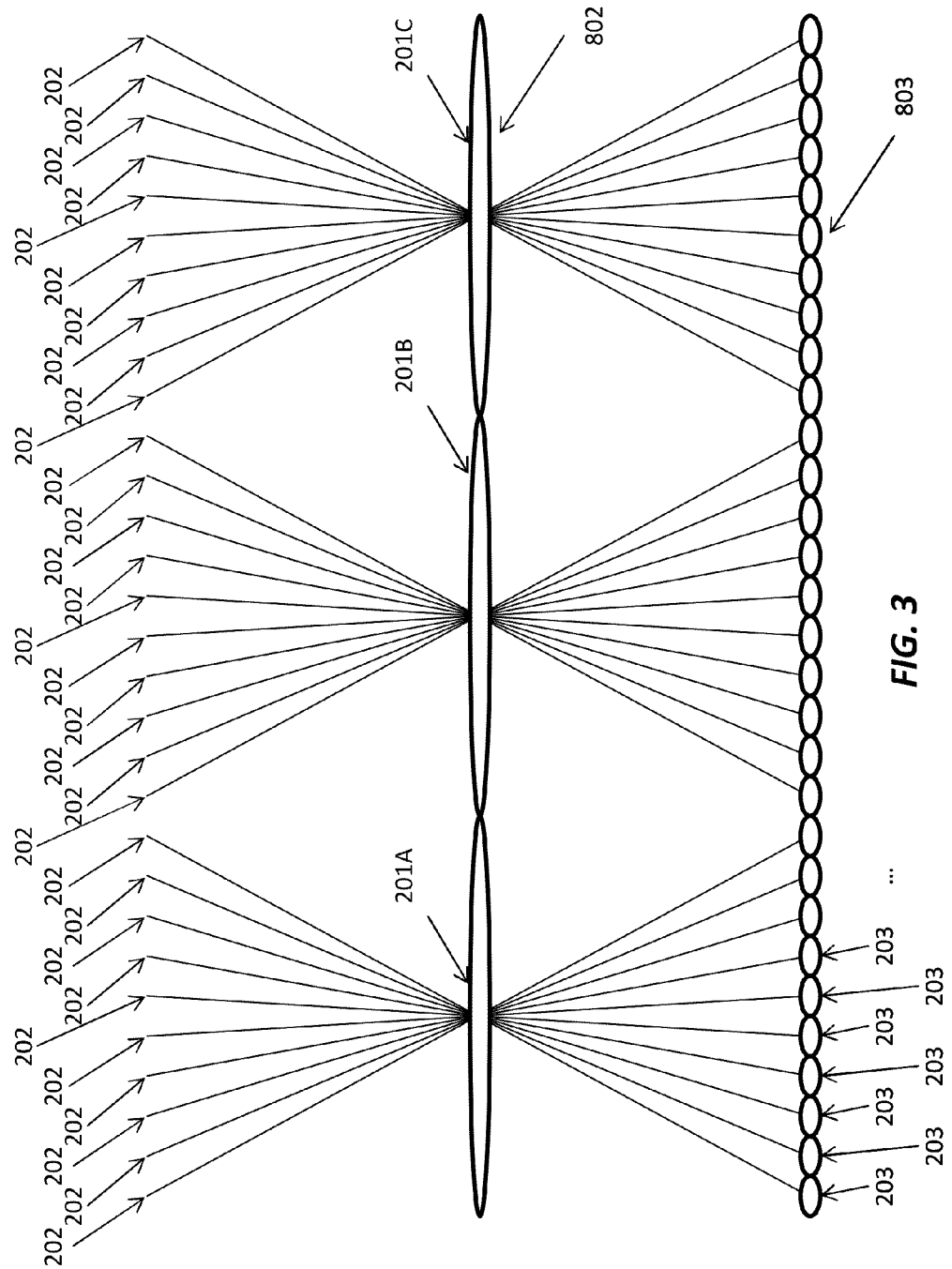
FIG. 3 depicts an arrangement of a light-field capture device wherein a microlens array is positioned such that images of a main-lens aperture, as projected onto the digital sensor, do not overlap.

There may be a one-to-one relationship between sensor pixels 203 and their representative rays 202. This relationship may be enforced by arranging the (apparent) size and position of main-lens aperture 812, relative to microlens array 802, such that images of aperture 812, as projected onto sensor 803, do not overlap. Referring now to FIG. 3, there is shown an example of an arrangement of a light-field capture device, such as camera 800, wherein microlens array 802 is positioned such that images of a main-lens aperture 812, as projected onto sensor 803, do not overlap. All rays 202 depicted in FIG. 3 are representative rays 202, as they all pass through the center of one of microlenses 201 to the center of a pixel 203 of sensor 803.

Figure 4:
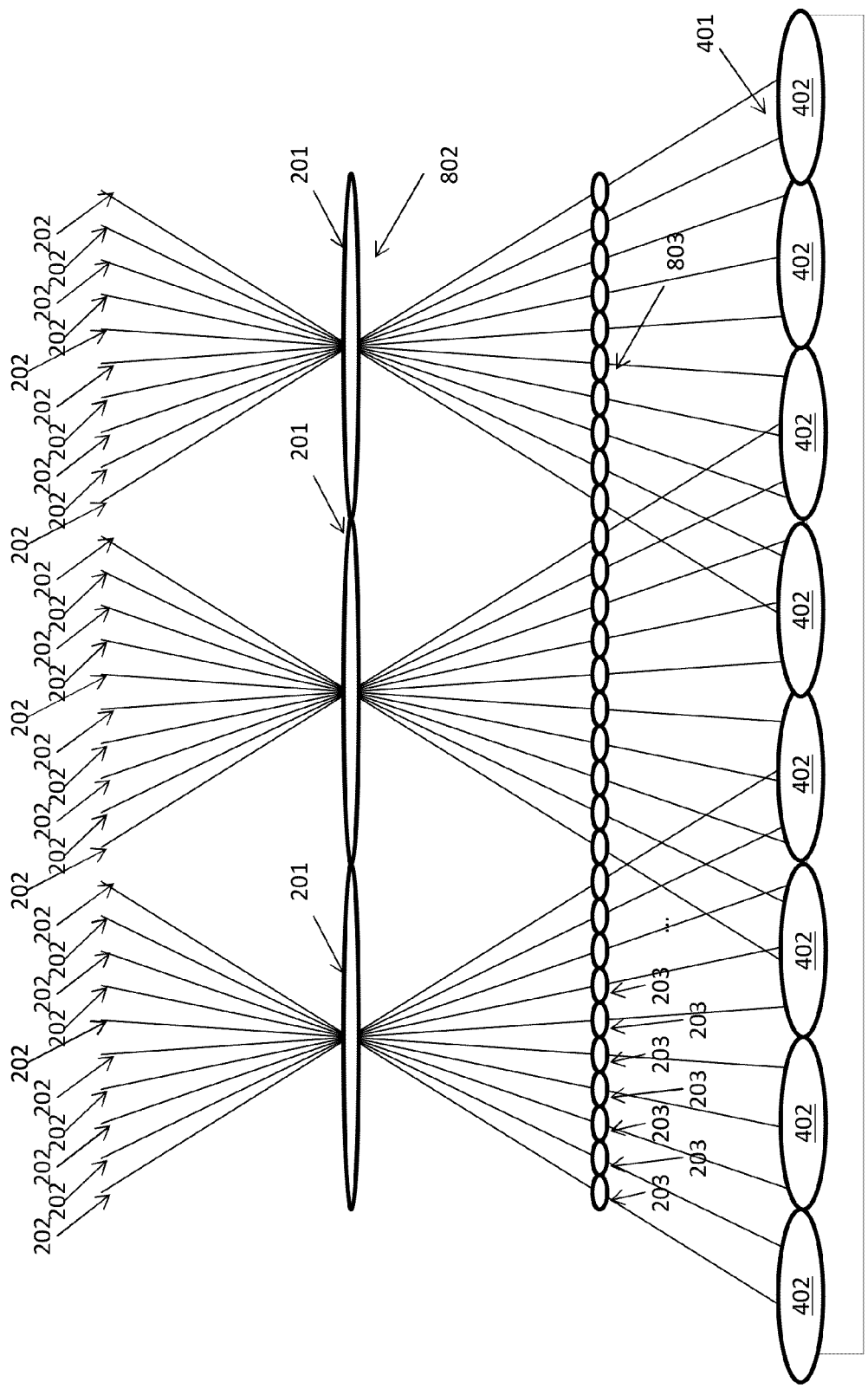
FIG. 4 depicts an example of projection and reconstruction to reduce a 4-D light-field representation to a 2-D image.

In at least one embodiment, the 4-D light-field representation may be reduced to a 2-D image through a process of projection and reconstruction. Referring now to FIG. 4, there is shown an example of such a process. A virtual surface of projection 401 may be introduced, and the intersection of each representative ray 202 with surface 401 is computed. Surface 401 may be planar or non-planar. If planar, it may be parallel to microlens array 802 and sensor 803, or it may not be parallel. In general, surface 401 may be positioned at any arbitrary location with respect to microlens array 802 and sensor 803. The color of each representative ray 202 may be taken to be equal to the color of its corresponding pixel. In at least one embodiment, pixels 203 of sensor 803 may include filters arranged in a regular pattern, such as a Bayer pattern, and converted to full-color pixels. Such conversion can take place prior to projection, so that projected rays 202 can be reconstructed without differentiation. Alternatively, separate reconstruction can be performed for each color channel.

The color of an image pixel 402 on projection surface 401 may be computed by summing the colors of representative rays 202 that intersect projection surface 401 within the domain of that image pixel 402. The domain may be within the boundary of the image pixel 402, or may extend beyond the boundary of the image pixel 402. The summation may be weighted, such that different representative rays 202 contribute different fractions to the sum. Ray weights may be assigned, for example, as a function of the location of the intersection between ray 202 and surface 401, relative to the center of a particular pixel 402. Any suitable weighting algorithm can be used, including for example a bilinear weighting algorithm, a bicubic weighting algorithm and/or a Gaussian weighting algorithm.

Artifacts Due to Incorrect Calibration

Existing light-field cameras can experience artifacts resulting from incorrect calibration of sensor 803. In at least one embodiment, the system of the present invention corrects such artifacts. Each pixel 203 on sensor 803 is illuminated by actual rays 202 of light that pass through microlens array 802. However, representative rays 202, as described above, are not actual rays of light, but are instead mathematical rays that are defined based on the geometric relationship of microlens array 802 and sensor 803. If representative rays 202 are to accurately represent the light that reaches a sensor pixel 203, the geometric relationship between microlens array 802 and pixels 203 on sensor 803 must be known to a sufficient degree of accuracy. If this relationship may vary from one sensor 803 to another, then calibration of each sensor 803 may serve to compensate for such variation. If the actual geometric relationship between microlens array 802 and sensor 803 differs from the (known) relationship indicated by calibration, images created by projecting the light-field image may contain unwanted artifacts.

Figure 5:
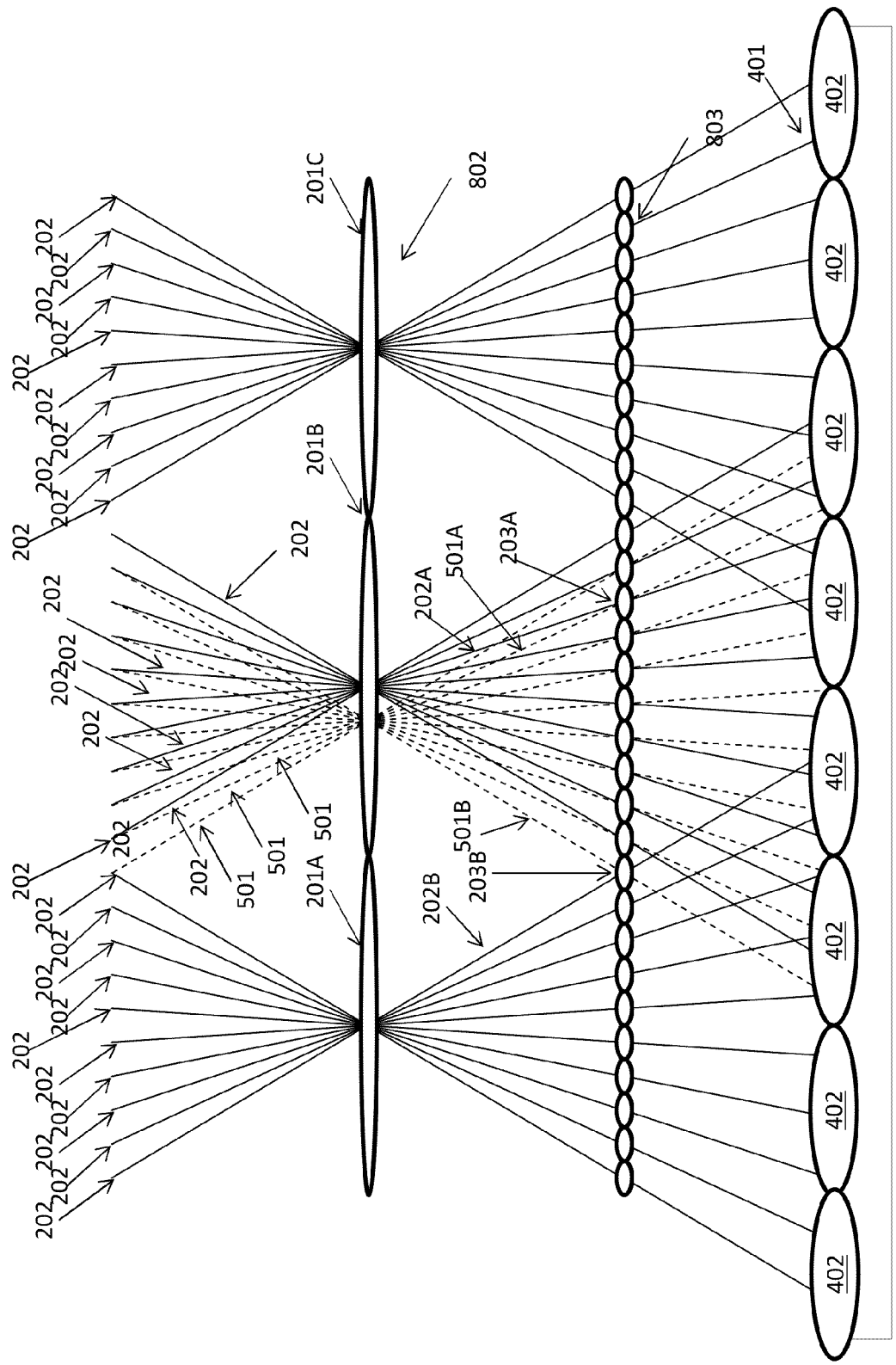
FIG. 5 depicts an example of incorrect calibration.

Referring now to FIG. 5, there is shown an example of incorrect calibration. Microlenses 201 and sensor pixels 203 are depicted in their calibrated geometric relationship—that is, as they are believed to be related. Representative rays 202, which pass through the calibrated microlens 201 centers and the centers of sensor pixels 203, are depicted with solid lines. In this example, the actual position of microlens 201B differs from the calibrated (expected) position. Actual light rays 501 that pass through the center of microlens 201B, and also pass through the centers of certain sensor pixels 203, are depicted with dashed lines. Thus the actual position of microlens 201B is centered at the point where the dashed lines representing actual light rays 501 intersect microlens 201B, rather than (as depicted) the point where the solid (representative) rays 202 intersect it. In this example, these positions differ by a distance equal to one-eighth of the microlens pitch.

One image artifact, referred to herein as geometric distortion, may result from the difference between 1) the representative ray 202 assigned to a sensor pixel 203 and 2) the actual light ray 501 that passes through the center of that sensor pixel 203 and the true center of the microlens 201 associated with that sensor pixel 203. This situation is illustrated by sensor pixel 203A in FIG. 5. The solid line passing through sensor pixel 203A is the representative ray 202A assigned to sensor pixel 203A. It passes through the calibrated center of microlens 201B, and through the center of sensor pixel 203A. The dashed line passing through the center of sensor pixel 203A is an actual light ray 501A, which passes through the true center of microlens 201B. During projection, the color of sensor pixel 203A will be projected along the path specified by the (solid) representative ray 202A passing through it. In actuality, however, light arrived at sensor pixel 203A from light rays surrounding dashed ray 501A, and should be projected along this path. This discrepancy between the projection and the actual light path causes artifacts.

The farther the rays are projected (that is, the greater the distance between the surface of sensor 803 and virtual projection surface 401) the greater the error due to divergence of each representative ray 202 from the corresponding actual ray. In the depicted example, although the distance between microlens array 802 and virtual projection surface 401 is not large (relative to the distance between microlens array 802 and the surface of sensor 803), representative ray 202A that passes through sensor pixel 203A intersects image pixel 402A, while the actual ray that passes through sensor pixel 203A intersects image pixel 402B. The farther virtual projection surface 401 is from microlens array 802, the greater the distance between the two intersections. This distance will manifest as geometric distortion in the projected image, the magnitude of the distortion being proportional to the distance between virtual projection surface 401 and microlens array 802. If projection to a range of surfaces 401 is animated (for example, as a focus sweep), regions of the resulting images in which calibration errors exist may sweep or twist across the field of view.

A second form of distortion, herein referred to as ghosting, may also result from incorrect microlens-position calibration. Ghosting is illustrated by sensor pixel 203B in FIG. 5. As in the case of sensor pixel 203A, representative ray 202B and actual light ray 501B passing through sensor pixel 203B follow different paths. Accordingly, geometric distortion, as described in the case of sensor pixel 203A, will result. But the difference between ray paths is much greater than for the rays that pass through sensor pixel 203A, because the two rays pass through different microlens centers—the representative ray passing through the pre-calibration center of microlens 201A, and the actual light ray passing through the true center of microlens 201B. This difference causes light passing through microlens 201B to be aggregated with light passing through sensor pixel 203B. The effect in projected images is adjacent duplicates of image features; hence the term "ghosting".

Light-field camera 800 may be designed so that small calibration errors result in geometric distortion, but do not cause ghosting. This may be accomplished, in at least one embodiment, by arranging the imaging geometry, including the geometry of sensor 803 and of the microlens array, so that disks 102 not only do not overlap, but are separated by a gap. Sensor pixels 203 are "assigned" to the nearest microlens 201 center, in calibrated coordinates, so gaps allow calibration errors up to half the gap size before a pixel's 203 assignment snaps to the incorrect microlens 201. Such a technique limits or eliminates ghosting, since, until such snapping occurs, calibration errors may result in only geometric distortion, rather than ghosting.

Disk-Center Calibration

Microlens 201 positions can be difficult to measure directly. However, they may be inferred from pixel values in the light-field image, which is readily available. Thus, in at least one embodiment, the key calibration problem is to identify the center of each disk 102 in the light-field image.

The center of a disk 102 is formally the point where a ray from the center of the exit pupil of the light-field camera's 800 main lens 813, which passes through the center of the corresponding microlens 201, intersects sensor 803. Assuming that the exit pupil is round, or nearly round, and that the light-field image is a modulation image, the center of a disk 102 may be approximated as the weighted-center of pixel values illuminated by rays passing through the corresponding microlens 201. The weighted-center of pixel values in the x dimension is the solution to $$0 = \Sigma_i p_i (x_i - x_{center}) \quad \text{(Eq. 1)}$$

for pixels 203 in the region i (those pixels 203 illuminated by rays passing through the corresponding microlens 201). In this equation, $x_i$ is the x coordinate of the pixel's 203 center, $p_i$ is the pixel's value, and $x_{center}$ is the x coordinate of the disk 102 center (that is being computed). The y coordinate of the weighted-center may be computed equivalently:

$$0 = \Sigma_i p_i (y_i - y_{center}) \quad \text{(Eq. 2)}$$

Figure 8:
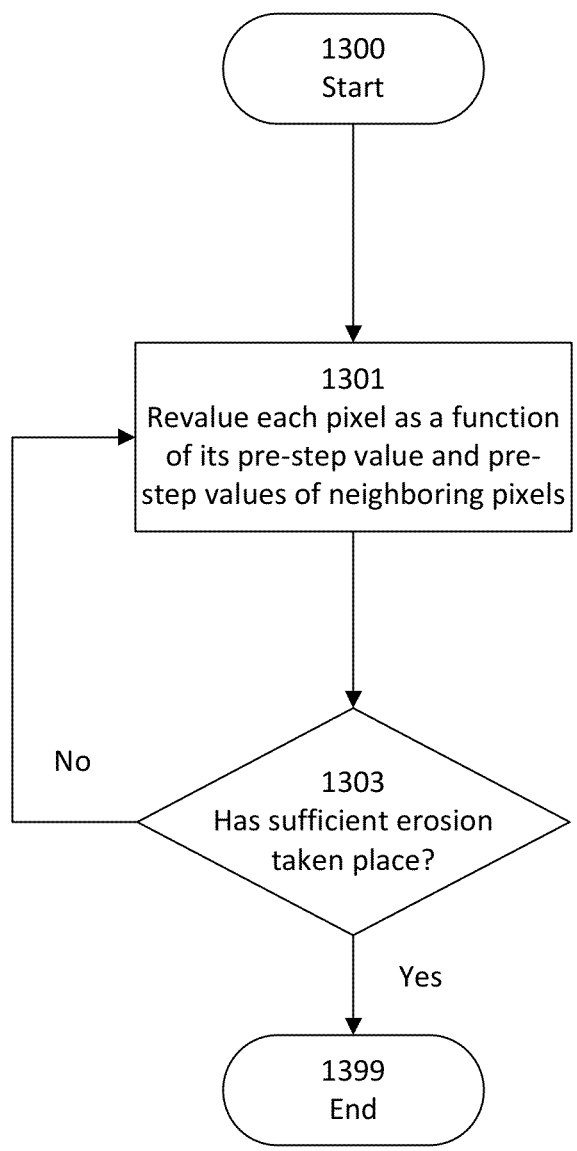
FIG. 8 is a flow diagram depicting an example of a method of grayscale image erosion, according to one embodiment.

With such a definition, however, it is necessary to know the disk 102 center, at least approximately, to determine which set of pixel values to consider when computing the weighted-center. (If pixels 203 corresponding to a different disk 102 are included in the weighted sum, the result will be incorrect.) In various embodiments, either of two general approaches can be used to estimate the center of a disk 102 prior to computing it more exactly using these equations. In a first embodiment, either of the following methods is performed:

1. Grayscale image erosion. Referring now to FIG. 8, there is shown an example of a method of grayscale image erosion, according to one embodiment. Grayscale image erosion is a morphological image processing technique that is well known in the art. A single morphological step 1301 revalues each pixel 203 in the image as a function of its pre-step value and the pre-step values of neighboring pixels 203. This serves to reduce (erode) the values of pixels 203 that are on the edge of groups of high-value pixels 203. A determination is made 1303 as to whether sufficient erosion has taken place; if not, step 1301 is repeated. Repeated erosion steps 1301 reliably reduce the light-field image to a pattern of 2×2-pixel illuminated regions (disks), with interstitial pixel values reduced (nearly) to zero. After erosion is complete 1399, these 2×2-pixel blocks can be identified, and their centers can be evaluated. (The equations given above reduce to linear interpolation for a 2×2-pixel block.)

2. Stepping. According to this method, a disk's 102 center is estimated by taking a grid step from the center of an accurately calibrated disk center. In a square tiling of microlenses 201, a grid step changes either x or y by the known microlens pitch. In a hexagonal tiling of microlenses 201, a grid step changes x and y in one of six directions, such that the distance moved is equal to the microlens pitch.

Figure 9:
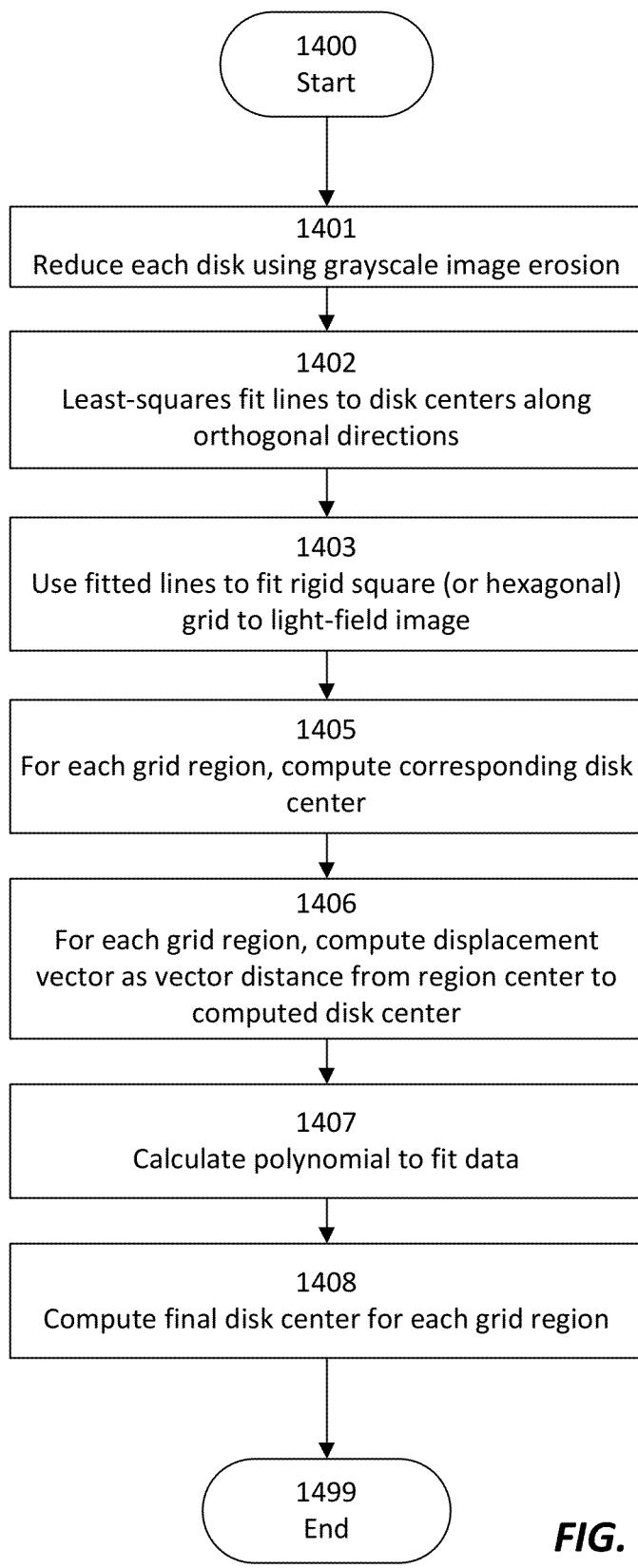
FIG. 9 is a flow diagram depicting an example of a method of gridded calibration, according to one embodiment.

In at least one embodiment, a technique referred to as gridded calibration is performed. Referring now to FIG. 9, there is shown an example of a method of gridded calibration, according to one embodiment. Each disk 102 in the light-field image is reduced 1401 to a roughly 2-pixel by 2-pixel point on a black background, using grayscale image erosion. A least-squares algorithm is applied 1402 to fit a small number of lines to the disk centers along orthogonal directions; these lines may be horizontal and vertical for a square grid, or at 60-degree angles for a hexagonal grid. Step 1402 may be implemented by fitting each line incrementally, first to a single disk center, then to additional disk centers at substantial incremental distances (for example, at 10-disk separations). In at least one embodiment, disks from defective microlenses are also detected and ignored during the mapping in order to prevent inaccurate mapping. Defective disks can include, but are not limited to, those that are decentered by greater than half of the disk pitch or have low transmission.

From the fitted lines generated in step 1402, a rigid square or hexagonal grid (as appropriate) is fitted 1403 to the entire light-field image.

For each grid region (such as a square or hexagonal region), the corresponding disk center is computed 1405 by passing all values for pixels 203 within that grid region into the weighted-center equations.

For each grid region, a vector distance is computed 1406 from the geometric center of the region to the computed disk center. This vector is assigned as the displacement associated with the corresponding disk center.

A 2D polynomial equation is calculated 1407 to fit the data describing the displacement vectors. In at least one embodiment, a third-order polynomial equation used, although any desired polynomial order can be used. The polynomial coefficients are determined via regression, such as the method of least squares. The fitting of the data to a polynomial has the effect of compressing the calculated data, as it can now be stored parametrically; it also serves to smooth the data to reduce errors in the gridded or stepping-based calibration.

In another embodiment, instead of or in addition to calculating a 2D polynomial 1407, a spatial filter is applied to the spatial array of displacement vectors. Any of a number of known and suitable filters, such as Gaussian and Box, can be used. Optimizations such as bucketing may also be employed. In at least one embodiment, a square filter is employed.

For each grid region, the final disk center is computed 1408 as the vector sum of the grid region's geometric center and displacement vector. The method ends 1499.

Figure 10:
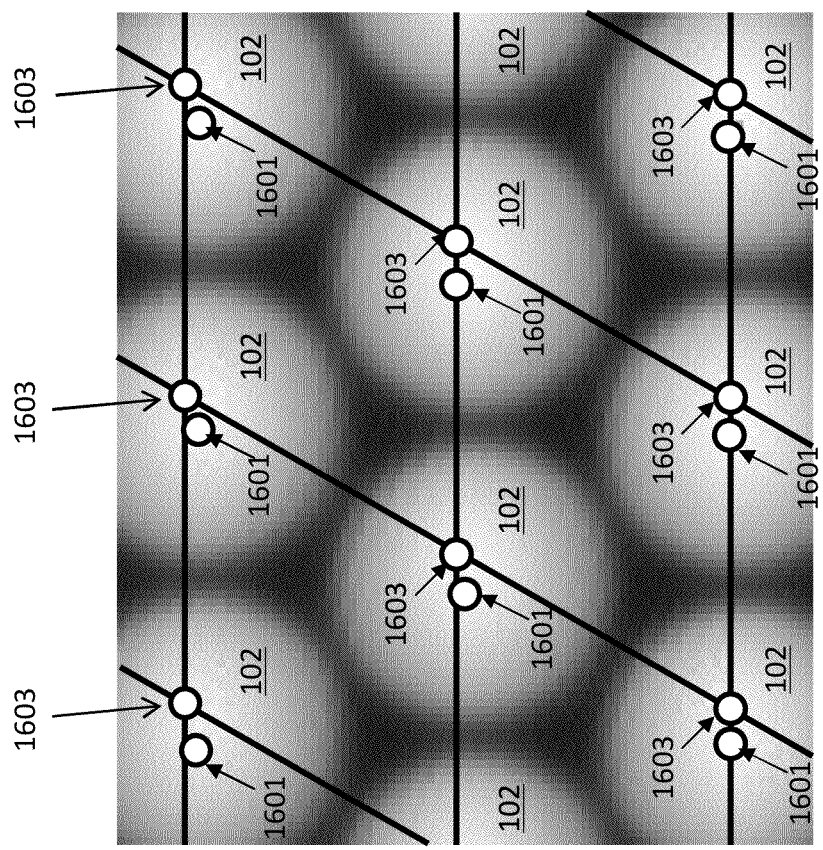
FIG. 10 depicts an example of gridded calibration in a hexagonal grid, according to one embodiment.

Referring now to FIG. 10, there is shown an example of gridded calibration in a hexagonal grid, according to one embodiment. A weighted center 1601 has been computed for each disk 102. Application of grid 1602 (using, for example, a least-squares algorithm) yields ideal position 1603 for each disk 102. A similar technique can be used for square grids.

In at least one embodiment, several steps of gridded calibration can be performed in parallel, allowing for efficient and high-performance implementation. In at least one embodiment, the primary limitation of the above-described gridded calibration method is that only small errors (displacement-vector magnitude less than half the pitch of microlens array 802) may be computed accurately. If manufacturing tolerances cannot be held to this tight standard, gridded calibration may fail to compute a correct calibration.

A second form of calibration, herein referred to as incremental calibration, may also operate on a modulation image, as is described in the above-cited related U.S. Provisional Application. Incremental calibration overcomes the primary shortcoming of gridded calibration, which is its inability to handle error vectors with magnitudes greater than half the microlens pitch. It does so by first calibrating a single disk, and then growing a region of calibrated disks around this initial disk, taking incremental (e.g., one-microlens) steps. From the initial microlens position, an incrementally larger area is considered, for example one that includes four microlenses. The gridded calibration is performed on this slightly larger array of microlenses. The gridding area is iteratively increased, and the gridded calibration is performed on each iteratively increased area, until the full microlens array is included. As long as the relative error of adjacent disks remains below some threshold, which may be fairly large, the correct 1-to-1 mapping of pre-calibration and post-calibration disks is ensured. After all disk centers have been calibrated, the calibrated centers are filtered with steps equivalent to steps 1406 to 1408 described above, wherein the displacement vectors may have magnitudes greater than half the microlens pitch.

A modulation image is an image that is computed from a flat-field image by normalizing based on average values (per color channel). For example, a modulation image may be an image of a uniform flat white scene. Ideally this would produce a corresponding uniform white image. However, due to non-idealities in an imaging system, such as vignetting, angular sensitivity of detectors, and the sensor fill factor of the microlens array, resultant images may have variations in intensity. To compensate for these non-idealities, the inverse of a modulation image can be applied to any image to correct for the intensity variation.

Additional details are provided in U.S. Provisional Application Ser. No. 61/604,155 for "Compensating for Sensor Saturation and Microlens Modulation During Light-Field Image Processing", filed on Feb. 28, 2012, the disclosure of which is incorporated herein by reference in its entirety.

Modulation images may vary as a function of camera parameters such as zoom, focus, and f-stop. Thus, in at least one embodiment, disk-center calibration is based on an appropriate modulation image.

In at least one embodiment, both gridded calibration and incremental calibration assume that the true center of a disk 102 corresponds to its pixel-weighted center. This may not be true in the case of vignetting, especially vignetting that is due to occlusion of the main-lens exit pupil. Such occlusion rarely occurs for disks 102 near the center of the light-field image, but may be common for disks 102 near the edge (or, especially, the corner) of the light-field image. Because such occlusion may vary slowly across the light-field image, and may vary little from one camera of the same design to another, it may be modeled as an invariant field for cameras of the same design. Both algorithms (gridded calibration and incremental calibration) may be modified to account for such occlusion vignetting by adding a step in which each calibrated disk center is perturbed to account for vignetting, by 1) resampling the vignetting field (which may itself be defined as a regular pattern of displacement vectors), and 2) adding the sampled displacement vector to the disk center.

Application of Calibration Data

Figure 11:
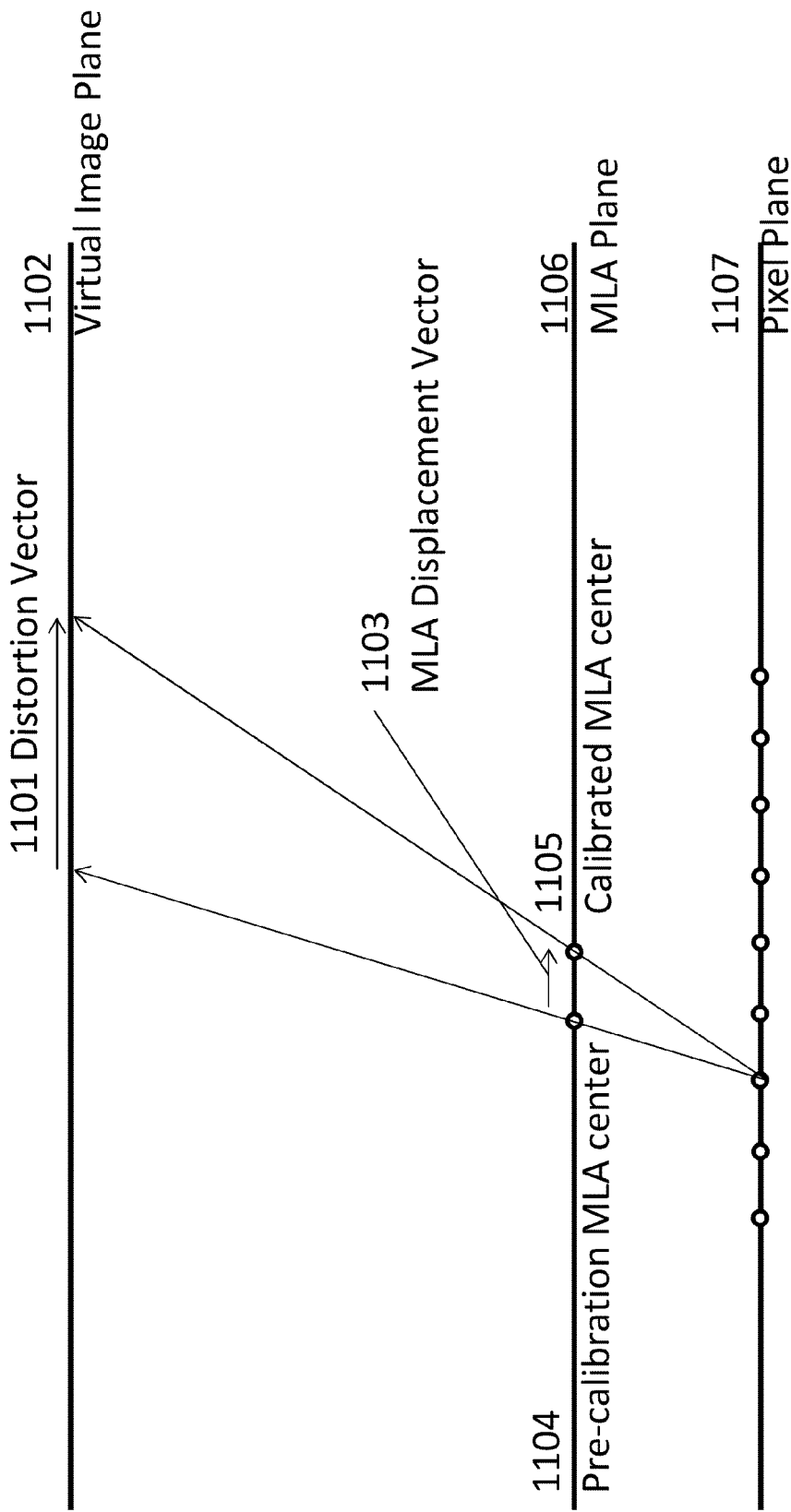
FIG. 11 depicts an example of the geometric relationship between projection depth and displacement vector between pre- and post-calibrated microlens centers.

After calibrated disk centers are computed, they may be employed in at least two ways:

1. Projection. Once calibrated representative rays 202 have been computed, they may be projected as described above. Representative rays 202 may be computed from calibrated disk centers in at least two different ways:
   a. Perspective. For each disk 102, the corresponding microlens 201 center may be computed by casting a ray 202 from the disk center to the center of the main-lens exit pupil, and then finding the intersection of this ray 202 with the surface of microlens array 802. A true representative ray 202 may then be determined for each pixel 402 in the light-field image as the ray 202 that extends from the corresponding microlens 201 center through the center of the sensor pixel 203.
   b. Orthographic. Each disk 102 may be treated as though it is at the center of microlens array 802, or equivalently, that its center is coincident with the optical axis of main lens 813. In this approximation, disk centers and microlens centers are the same in two coordinates; they differ only in the dimension that is parallel to the main lens optical axis. Equivalently, for each disk 102, the corresponding microlens center may be computed by casting a ray from the disk center directly up toward microlens array 802, and then finding the intersection of this ray with the surface of microlens array 802. An orthographic representative ray 202 may then be found for each image pixel 402 in the light-field image as the ray that extends from the corresponding microlens 201 center through the center of the sensor pixel 203.
2. Warping. Projection may also be computed using representative rays 202 that pass through pre-calibration microlens centers. In this case, regions in the image are distorted as a predictable function of their depth, based on a geometric relationship between the projection depth and the displacement vector between the pre- and post-calibrated microlens centers. Referring now to FIG. 11, there is shown an example of this relationship. MLA displacement vector 1103 represents the shift in MLA center position along MLA plane 1106, from pre-calibration MLA center 1104 to calibrated MLA center 1105. Distortion vector 1101 has a magnitude based on the geometric relationship between a) the distance from pixel plane 1107 to MLA plane 1106; b) the distance from MLA plane 1106 to virtual image plane 1102, and c) the magnitude of MLA displacement vector 1103. In an extended depth of field image, a depth map is used to project to many virtual surfaces at different depths based on a calculated depth map; thus the distance from MLA plane 1106 to virtual image plane 1102 differs depending on which virtual image is being projected to. A depth map may be computed using techniques that are known in the art. Using this depth map and known magnitude of MLA displacement vector 1103, a distortion vector 1101 may be estimated for each pixel in the projected image. The distortion vector is then applied to each pixel in the projected image to correct the distortion at each pixel.

Influence

In at least one embodiment, representative rays 202 that pass through the centers of pixels 203 which are themselves near the centers of disks 102 may be given more influence in the reconstructed 2-D image than representative rays that pass through pixels 203 that lie near the edge of disks 102. An influence value may be assigned to each representative ray 202. This influence value may be computed as a function of sensor-pixel location and of other parameters. In such an embodiment, each pixel 402 in the 2-D image may include an influence value, in addition to the values of its color components. During reconstruction, color components are multiplied by the filter coefficient (as described above) and also by the ray's influence value, before they are summed into the 2-D image pixel 402. The product of the filter coefficient and the ray's 202 influence value is then summed to the 2-D pixel's influence value. When all representative rays have been processed, the color components in each 2-D image pixel are normalized, meaning that they are divided by the 2-D pixel's influence value. After normalization of a pixel is complete, that pixel's influence value may be discarded.

Any of a number of different functions may be employed to compute influence values. In at least one embodiment, for example, each representative ray's 202 influence value is set to the value of a corresponding pixel in the modulation image. This corresponding pixel is the pixel 203 through which the representative ray 202 passes.

Influence Based on Noise Function

In at least one embodiment, the influence value is determined based on a function that takes noise into account. In the projection process, if all sensor pixels 203 $\{L_i | i=1, \ldots, N\}$ reaching the same image pixel 402 are assumed to come from the same physical point in the scene, and if they are equally affected by the optical and electrical system and thus have identical signal strength and noise level, an estimate of the pixel value of that image pixel 402, say p, is $$\tilde{p} = \frac{\sum L_i}{N} \quad \text{(Eq. 3)}$$

This assumes that sensor pixels 203 are demodulated to begin with. Let $m_i$ denote the modulation factor for i-th sample. $m_i$ can be obtained from the modulation image. The imaging system can apply an analog or digital gain factor g to the sensed signal, before storing pixel values in digital form. Each sensor pixel 203 may also be affected by noise $N_i$.

Combining all these factors together, the sensor pixel value $E_i$ is related to the ideal sensor pixel value $L_i$ by the equation:

$$E_i = gm_iL_i + N_i \qquad \text{(Eq. 4)}$$

Given the noisy and scaled signal, the task is to find the optimal estimate of p. The "optimality" of the estimate can be defined as the expected difference between the estimate and the true value. To compute the estimate or measure its optimality, the noise characteristics of the system can be modeled. In the imaging system, the noise $N_i$ usually has zero-mean, and its variance can be decoupled into two main components, including one that depends on the ideal sensor pixel value $L_i$, and another that is signal-independent, as follows:

$$v_{E_i}^2 = g^2(m_iL_i) + v_C^2 \qquad \text{(Eq. 5)}$$

Given this model, the estimate of $L_i$ and its variance can be calculated:

$$\tilde{L}_i = \frac{E_i}{gm_i}, \quad v_{L_i}^2 = \frac{v_{E_i}^2}{g^2 m_i^2} \qquad \text{(Eq. 6)}$$

Note that this calculation is the so-called demodulation process. Then, using the statistical estimation technique, the optimal estimate of p can be calculated from an estimated $\{\tilde{L}_i\}$ as $$\tilde{p} = \left(\sum \frac{1}{v_{L_i}^2}\tilde{L}_i\right)\left(\sum \frac{1}{v_{L_i}^2}\right)^{-1} \qquad \text{(Eq. 7)}$$

Thus, samples with lower variance tend to have higher influence in the estimation process. If the influence of each sensor pixel 203 is defined as $w_i$, the optimal influence value can be expressed as:

$$w_i = v_{(\tilde{L}_i)}^{-2} = \frac{g^2 m_i^2}{v_{E_i}^2} = \frac{g^2 m_i^2}{\{g^2(m_iL_i) + v_C^2\}} \qquad \text{(Eq. 8)}$$

This particular formulation is merely exemplary. In various other embodiments, the system of the present invention can use other techniques for taking noise into account in determining influence for pixels 203 at different positions within disks 102. Different techniques may be applicable for different imaging systems. For example, if a sensor pixel 203 is defective or is clamped due to saturation, there may be no way to infer the original pixel $L_i$ value from the corrupted data $E_i$. In this case, the variance of this sensor pixel 203 can be modeled as infinite, and thus the influence would be zero. Alternatively, if there is no signal-dependent component in the noise, the optimal influence would be:

$$w_i = \frac{g^2 m_i^2}{v_C^2} \qquad \text{(Eq. 9)}$$

Infilling

After projection of rays to the 2-D image is complete, but prior to normalization of influence values, it may be determined that some pixels 402 in this 2-D image have reconstructed influence values that are either zero (because no rays 202 contributed to this pixel 402) or are substantially lower than the influence values of other pixels 402. Such a finding indicates that there are gaps, or "holes", in the reconstructed 2-D image. These holes (which may be due to insufficient sampling, perhaps as a result of irregularities in the sampling pattern due to variations in the positions of microlenses) may be eliminated by a process of infilling: using the values of nearby pixels 402 to estimate the value of pixels 402 in the "hole". Infilling techniques are described in related U.S. Utility application Ser. No. 13/688,026 for "Compensating for Variation in Microlens Position During Light-Field Image Processing", filed on Nov. 28, 2012, the disclosure of which is incorporated herein by reference in its entirety Depth Map Generation A depth map is a set of image-side points (points on the image side of main lens 813), each of which corresponds to a visible point in the scene. A point in the scene is visible if light emitted from it reaches the anterior nodal point of main lens 813, either directly or by being reflected from a highly specular surface. The correspondence is such that light emitted from the scene point would be in best focus by main lens 813 at the corresponding image-side point. In at least one embodiment, the optical effects of microlens array 802 (primarily refraction and reflection) and of sensor 803 (primarily occlusion) are not taken into account for the calculation of best focus; it is as though these optical elements were not present.

The position of an image-side point in a depth map may be specified in Cartesian coordinates, with x and y indicating position as projected onto sensor 803 (x positive to the right, y positive up, when viewing toward the scene along the optical axis of main lens 813), and depth d indicating perpendicular distance from the surface of microlens array 802 (positive toward the scene, negative away from the scene). The units of x and y may be pixels—the pixel pitch of sensor 803. The units of d may be lambdas, where a distance of one lambda corresponds to the distance along which a cone of light from any scene point changes its diameter by a value equal to the pitch of microlens array 802. (The pitch of microlens array 802 is the average distance between the centers of adjacent microlenses 201.)

Depth maps are known in the art. See, for example: J. Sun, H.-Y. Shum and N.-N. Zheng, "Stereo Matching using Belief Propagation," *IEEE Transactions on Pattern Analysis and Machine Intelligence*, vol. 25, no. 7, pp. 787-800, 2003; and C.-K. Liang, T.-H. Lin, B.-Y. Wong, C. Liu, and H. Chen, "Programmable Aperture Photography: Multiplexed Light-field Acquisition," *ACM TRANS. GRAPH.* 27, 3, Article 55, 2008.

The following observations can be made concerning scene-side points that are directly visible to main lens 813:

- Points at scene depths on the plane of best focus in the scene correspond to an image depth at the (microlens) surface, or plane, of sensor 803.
- Points at scene depths that are farther from camera 800 than the plane of best focus correspond to points with image depths that are closer to the main lens 802 than the plane of best focus, and therefore that have positive depth values.
- Points at scene depths that are nearer to the camera 800 than the plane of best focus correspond to points with image depths that are further from the main lens 802 than the plane of best focus, and therefore that have negative depth values.

A depth map may be computed using techniques that are known in the art. The depth map may include image depth values at points with a regular distribution in x and y, and thus may be treated as a height field. The sample density of this height field, in the x and y dimensions, may roughly correspond to the distribution of microlens centers, or it may be greater or smaller.

Assigning Depth Values to Representative Rays

A depth value may be assigned to each representative ray 202 by intersecting that ray 202 with the image depth height field. If the representative ray 202 intersects the height field at multiple locations, the intersection that is farthest behind microlens 802 surface is selected. (This corresponds to the scene intersection that is nearest to camera 800.) The depth value at this intersection is assigned to representative ray 202. If there is no intersection, representative ray 202 may be discarded, or it may be assigned a depth value by another means. For example, it may be assigned a depth value computed from depth values assigned to nearby rays 202.

Algorithms for computing the intersection of a ray 202 with a height field are known in the art. For example, a ray 202 may intersect a height-field point if it passes within a threshold distance of that point. Alternatively, the height-field points may be interpreted as control points for a surface, and ray 202 can be intersected with that surface.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in at least one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A light-field image capture device, comprising:
   a microlens array comprising a plurality of microlenses;
   optics, configured to direct incoming light toward the microlens array; and
   an image sensor, comprising a plurality of pixel sensors;
   wherein:
   the microlens array is disposed between the optics and the image sensor; and
   each microlens in the microlens array is configured to project light onto a different region of the image sensor, each region comprising a subset of the pixel sensors, each region being horizontally separated from all other regions by a gap comprising at least one pixel sensor.

2. The device of claim 1, wherein each region comprises a disk.

3. The device of claim 1, wherein each region is circular.

4. The device of claim 1, wherein no region touches any other region.

5. The device of claim 1, wherein the optics comprise:
   an aperture, configured to receiving incoming light; and
   a main lens, configured to focus incoming light from the aperture toward the microlens array.

6. The device of claim 1, wherein each pixel sensor is associated with a microlens based on calibrated coordinates of light passing through the microlens.

7. In a light-field image capture device comprising a microlens array comprising a plurality of microlenses, optics configured to direct incoming light toward the microlens array, and an image sensor comprising a plurality of pixel sensors, a configuration method, comprising:
   positioning the microlens array between the optics and the image sensor; and
   configuring each microlens in the microlens array to project light onto a different region of the image sensor, each region comprising a subset of the pixel sensors, each region being horizontally separated from all other regions by a gap comprising at least one pixel sensor.

8. The configuration method of claim 7, wherein each region comprises a disk.

9. The configuration method of claim 7, wherein each region is circular.

10. The configuration method of claim 7, wherein no region touches any other region.

11. The configuration method of claim 7, wherein the optics comprise:
    an aperture, configured to receiving incoming light; and
    a main lens, configured to focus incoming light from the aperture toward the microlens array.

12. The configuration method of claim 7, further comprising associating each pixel sensor with a microlens based on calibrated coordinates of light passing through the microlens.

* * * * *